United States Patent [19]

Van Iperen et al.

[11] Patent Number: 4,840,979

[45] Date of Patent: Jun. 20, 1989

[54] PROCESS FOR PREPARING CATIONIC COATING COMPOSITIONS USING AMMONIA ADDUCTS OF EPOXY RESINS WHICH ARE FURTHER REACTED WITH A CYCLIC ANHYDRIDE

[75] Inventors: Roeland Van Iperen; Johannes M. Van Der Mark; Petrus G. Kooijmans, all of Amsterdam, Netherlands

[73] Assignee: Shell Oil Company, Houston, Tex.

[21] Appl. No.: 204,912

[22] Filed: Jun. 10, 1988

Related U.S. Application Data

[63] Continuation of Ser. No. 90,277, Aug. 28, 1987, abandoned.

[30] Foreign Application Priority Data

Sep. 5, 1986 [GB] United Kingdom ............... 8621491

[51] Int. Cl.$^4$ ........................... C08K 5/16; C08L 63/00
[52] U.S. Cl. ..................................... 523/404; 525/504; 528/98; 528/100; 528/101; 528/103
[58] Field of Search ..................... 523/404; 525/504; 528/98, 100, 101, 103

[56] References Cited

U.S. PATENT DOCUMENTS

| 2,844,553 | 7/1958 | Taylor et al. | 525/507 |
| 4,137,220 | 1/1979 | Laxmerini et al. | 528/135 |
| 4,174,333 | 11/1979 | Hartman et al. | 528/101 |
| 4,368,298 | 1/1983 | Okayama et al. | 525/480 |
| 4,738,995 | 4/1988 | Kooijmans et al. | 523/404 |
| 4,772,669 | 9/1988 | van Iperen et al. | 525/484 |

FOREIGN PATENT DOCUMENTS 1221906 2/1971 Netherlands .
2001991 2/1979 United Kingdom .
2037291 7/1980 United Kingdom .

Primary Examiner—John Kight
Assistant Examiner—Frederick Krass

[57] ABSTRACT

This invention provides a process for the preparation of cationic coating compositions, which comprises blending:

(1) 5–35% w of a crosslinking compound, and
(2) 65–95% w of a carboxylated amide group-containing amino binder being the reaction product of an amino group-containing resin binder and not more than about 0.1 mol of a cyclic anhydride per amino group equivalent of said amino group containing resin binder, which amino group-containing binder comprises the reaction product of
  (a) ammonia, and
  (b) a blend of
    ($b_1$) a polyglycidyl ether having n epoxy groups per molecule, wherein $1<n<1.9$, said polyglycidyl ether being the reaction product of a multifunctional polyglycidyl ether having x epoxy groups per molecule, wherein $x>2$, and $(x-n)$ mol of a monofunctional phenol per mol of the multifunctional polyglycidyl ether, and
    ($b_2$) a diglycidyl ether, having an EGC in the range of from 1000 to 5500 mmol/kg,
  the average molar epoxy functionality of the glycidyl ethers present in the blend of polyglycidyl ether and diglycidyl ether being $<1.75$.

The thus prepared coating compositions when used for coating the interior of food and beverage cans, result in coatings which combine very good taste performance properties with a high level of mechanical and chemical resistance properties.

19 Claims, No Drawings

PROCESS FOR PREPARING CATIONIC COATING COMPOSITIONS USING AMMONIA ADDUCTS OF EPOXY RESINS WHICH ARE FURTHER REACTED WITH A CYCLIC ANHYDRIDE

This is a continuation of application Ser. No. 090,277, filed Aug. 28, 1987, now abandoned.

BACKGROUND OF THE INVENTION

This invention relates to a process for the preparation of hydrolytically stable cationic coating compositions, to the coating compositions prepared by said process and to the use thereof, particularly to their use as aqueous thermosetting coating compositions for application via electro deposition.

In the copending British Patent Application, application No. 8616162, water-thinnable, hydrolytically stable, thermosetting cationic coating compositions have been described, comprising a blend of a carboxylated crosslinking compound and an amine group-containing resin binder, being the reaction product of ammonia and at least a specific type of polyglycidyl ether. Said cationic coating compositions are suited for coating the interior of beer and beverage cans, especially for such applications where the taste performance requirements are important.

In order to achieve the combination of performance requirements of good taste performance and good mechanical and chemical resistance, it has been found useful to employ a carboxylated crosslinking compound in the cationic coating composition in place of conventional crosslinking compunds such as non-carboxylated melamine formaldehyde resins. It is believed that the presence of the carboxy groups in the crosslinking compound has a catalytic effect on the crosslinking reaction during stoving.

A disadvantage associated with the use of carboxylated crosslinking compounds such as carboxylated melamine formaldehyde resins, is that they are not as widely available as their non-carboxylated counterparts, and thus the applicability of these amino group-containing binders is limited. Moreover, if the performance of the ultimate coating requires the concentration of the carboxy groups as total binder to be adjusted, this can only be done by simultaneously changing the ratio of the amino group-containing binder and the crosslinking compound. This change in binder composition would be reflected in the balance of performance properties, especially the mechanical performance properties.

It is therefore an object of the invention to develop cationic coating compositions which do not have the disadvantages inherent to the use of the carboxylated crosslinking compounds but have the high level of performance properties which such carboxylated crosslinking compounds impart to cationic coating compositions.

SUMMARY OF THE INVENTION

According to the invention, a process for the preparation of a water-thinnable, hydrolytically stable, thermosetting, cationic coating composition comprises blending:

(1) from about 5 to about 35 weight percent of a crosslinking compound, and
(2) from about 65 to about 95 weight percent of a carboxylated amide group-containing amino binder which is the reaction product of an amino group-containing resin binder and not more than about 0.1 mol of a cyclic anhydride per amino group equivalent of said amino group containing resin binder, which amino group-containing binder comprises the reaction product of (a) ammonia, and
(b) a blend of
(b$_1$) a polyglycidyl ether having n epoxy groups per molecule, wherein $1<n<1.9$, said polyglycidyl ether being the reaction product of a multifunctional polyglycidyl ether having x epoxy group per molecule, wherein $x>2$, and $(x-n)$ mol of a monofunctional phenol per mol of the multifunctional polyglycidyl ether, and
(b$_2$) a diglycidyl ether, having an epoxy group concentration (EGC) in the range of from 1000 to 5500 mmol/kg, the average molar epoxy functionality of the glycidyl ethers present in the blend of polyglycidyl ether and diglycidyl ether being $<1.75$.

The amino binders containing carboxylated amide groups present in a relatively low concentration vis-a-vis the amino groups can be made water-thinnable by neutralizing the amino groups with an acid. These carboxylated amide group-containing binders and the cationic coating compositions based thereon thus differ from the anionic coating compositions based on carboxylated amide group-containing binders, wherein the carboxylated amide group content is sufficiently high to make the binder water reducible after neutralization with a base. Such anionic coating compositions have been described in UK Patent Application GB NO.2.037291 A.

The multifunctional polyglycidyl ether from which the polyglycidyl ether having n epoxy groups per molecule is derived may conveniently be a polyglycidyl ether prepared by reaction of a polyhydric phenol having a phenolic hydroxyl functionality greater than 2, with an epihalodrin, preferably epichlorohydrin, in the presence of a hydrogen halide acceptor, e.g., an alkali metal hydroxide.

Examples of suitable such polyhydric phenols are novolac resins of general formula

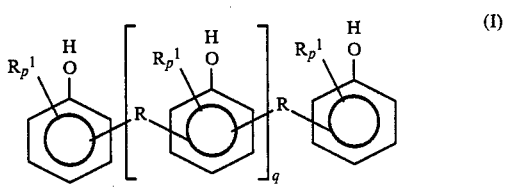

wherein R represents an alkylene, e.g. CH$_2$ group, R$^1$ represents an alkyl group, e.g. a methyl, p-t-butyl, octyl or nonyl group, q and p are numbers having average values $0<q<6$ and $0<p<2$, or of general formula

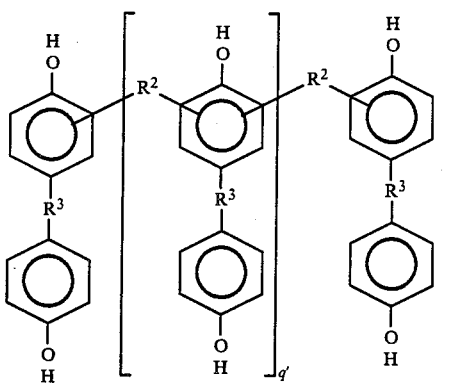

(II)

wherein $R^2$ represents an alkylene, e.g. $CH_2$ group, $R^3$ represents an alkylene, e.g. $CH_2$ or $C(CH_3)_2$ group, a carbonyl group, an oxygen or sulphur atom and $q'$ is a number having an average value in the range of from 0 to 2.

Other examples of suitable polyhydric polynuclear phenols are 1,1,2,2-tetra-(4-hydroxyphenyl)ethane and the tetraphenol derived from diphenolic acid having the general formula

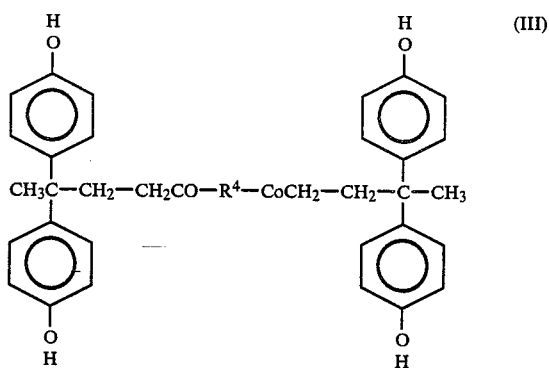

(III)

wherein $R^4$ represents the residue of a diol. Polyglycidyl ethers derived from polyhydric phenols of formulae I, II and III are known and are described, together with processes for their preparation, in, for example, U.S. Pat. No. 2,844,553, Dutch Patent Application 8100830, W. German Patent Application No. 2,656,867 and British Patent Application No. 2001991.

Preferably the multifunctional polyglycidyl ether is an epoxy novolac resin wherein x is in the range from 2.5 to 3.5.

The monofunctional phenol may be a single phenol or a mixture of phenols. For example, the phenol may conveniently be phenol, optionally substituted by one or more of one or more substituents selected from $C_{1-16}$ alkyl, $C_{3-16}$ alkenyl, $C_{1-4}$ hydroxyalkyl, $C_{2-13}$ alkoxycarbonyl and $C_{1-16}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4-12}$ alkyl substituent. Examples of such alkyl substituents include n-, iso- and t-butyl, n- and iso-octyl, n- and iso-nonyl and n- and iso-dodecyl groups. Branched alkyl substituents are particularly suitable. P-iso-octyl phenol has been found to be a very suitable monofunctional penol.

The diglycidyl ether will generally be a diglycidyl ether of a dihydric phenol such as 2,2-bis(4-hydroxyphenyl)propane. Examples of diglycidyl ethers based on such a dihydric phenol are "EPIKOTE 1001‘ (registered trademark) (EGC 2000 to 2220) and "EPIKOTE 3003‘ (registered trademark) (EGC 1210 to 1380). Preferred diglycidyl ethers have a EGC in the range of from 1800 to 2400.

The reaction between ammonia and epoxy groups is known. From British Patent Specification No. 1221906, wherein reaction products of ammonia and diglycidyl ethers have been described, it can be concluded that the content of secondary and tertiary amino groups present in the reaction product, is related to the excess of ammonia over epoxy used. A smaller excess will increase the content of secondary and tertiary amino groups as well as the molecular weight of the reaction product and the risk of gelation.

It can be expected that the presence of such higher molecular weight polyaddition products will contribute positively towards the performance of the ultimate coating. Although it might be possible to prepare such higher molecular weight reaction products by carefully controlled process conditions, in the process of the present invention it has been found advantageous to reduce the risk of gelation by restricting the average number of epoxy groups per molecule of glycidyl ether. For the polyglycidyl ether the average molar epoxy functionality is restricted to $1<n<1.9$ preferably $1.3<n\leq1.6$, while the average molar epoxy functionality for the glycidyl ethers present in the blend of polyglycidyl ethers and diglycidyl ether is set at $<1.75$.

It is preferred that the polyglycidyl ether and diglycidyl ethers are present in said blend in a weight ratio in the range of from 75:25 to 45:55.

In the preparation of the amino group-containing binders, it is preferred that on average 0.45 to 0.6 mol of ammonia is reacted per equivalent of epoxy, for which at least 4.5 equivalents of amino-hydrogen per equivalent of epoxy is generally employed.

In the preparation of the amino group-containing binders, the blend of the polyglycidyl ether and diglycidyl ether may conveniently be contacted with ammonia while dissolved in an organic solvent. Preferably said solvent is a water-miscible solvent and includes mono $C_{1-6}$ alkyl ethers of mono- or polyethylene glycol or mono- or polypropylene glycol, and cyclic ethers such as tetrahydrofuran (THF) or dioxane. A preferred water-miscible solvent is 2-n-butoxyethanol.

The glycidyl ether content of these solutions may conveniently be in the range of from 50 to 90%w and preferably in the range of from 60 to 70%w. Ammonia may be introduced into the reactor as supplied, e.g., as a 25%w aqueous solution. The resulting mixture will generally be inhomogeneous and may as such be used for preparing the amino group-containing binder. It has, however, proven to be advantageous to carry out the reaction with ammonia in the presence of one or more solvents, which when present in a sufficient concentration will convert the reactor contents into a more or less homogeneous mixture. Suitable such solvents include lower alcohols such as methanol and ethanol as well as lower ethers, especially cyclic ethers such as THF and dioxane. Very promising results have been obtained with a 4:1 w/w blend of THF and ethanol.

The reaction with ammonia is carried out at a temperature in the range of from 20° to 120° C. and at atmospheric or slightly above atmospheric pressure.

The introduction of the carboxy groups by reacting the amino group-containing resin binder with a cyclic anhydride may be conducted at a temperature in the range of from 30 to 120° C., preferably at a temperature in the range of from 60° to 90° C. Said reaction is preferably carried out in the presence of a solvent, e.g., a glycol ether, such as 2-n-butoxy-ethanol. Depending on the reaction temperature, the conversion of the amino groups into the corresponding carboxylated amide groups can be accomplished within 30 minutes. The cyclic anhydrides which may be employed in the process of the present invention are intra molecular anhydrides having from 4 to 12 carbon atoms per molecule and include anhydrides such as succinic anhydride, chlorosuccinic anhydride, maleic anhydride and hexahydrophthalic anhydride. Trimellitic anhydride (TMA) is a preferred anhydride. The carboxylated binder can be neutralized before or after blending with the crosslinking compound.

The crosslinking compounds which may be employed in formulating the cationic coating compositions include water-thinnable as well as solvent-borne and non-water-thinnable melamine-, urea- and phenolformaldehyde resins. The invention is not restricted to the use of the conventional crosslinking compounds mentioned herein, but is also understood to include modified melamine-, urea- and phenolformaldehyde resins, such as chelating group-containing melamineformaldehyde resins. The crosslinking compounds are preferably used in a ratio of carboxylated amide group-containing resin binder to crosslinking compound of 85:15 to 70:30 w/w. Pigments, fillers, dispersing agents, and other components known in the art of paint formulation may further be added. Addition of small amounts (up to 1%w) of non-ionic surfactant may be useful for further stabilization of aqueous compositions or improvement of the wetting during application. Co-solvents, such as 2-n-butoxyethanol and, especially, 2-n-hexyloxyethanol, may advantageously be included. The water for use in the aqueous compositions is preferably purified, such as by distillation or demineralization. The water-dilutable compositions may be applied by a variety of methods known in the art, onto a variety of substrates, in particular metals such as bare steel, phosphated steel, chromate-treated steel, zinc, tin plate (for can coating), and aluminum (also e.g. for can coating), to produce cured coatings of desirable thickness from 2 micrometers upwards up to in general 40 micrometers.

Curing of the coating compositions made according to the process of the present invention can be performed by stoving, for example, at temperatures of from 170° to 220° C., with curing times varying from 3 to 20 minutes.

The thermosetting coating compositions may generally be applied by electrodeposition and other methods such as spraying or dipping, and are particularly suitable for coating cans by electrodeposition.

The invention will be further understood from the following examples, in which parts and percentages are by weight, unless otherwise indicated, and various terms are defined as follows:

Polyether I is a multifunctional epoxy diphenylolpropane novolac resin, having an average molecular weight 615 and on average 3.1 epoxy groups per molecule.

Polyether II is a multifunctional epoxy novolac resin, having an average molecular weight 665 and on average 3.5 epoxy groups per molecule.

Polyether E-1 is a solid diglycidyl ether of 2,2-bis(4-hydroxyphenyl)propane having an EGC of 2119 mmol/kg.

Polyether E-2 is a solid diglycidyl ether of 2,2-bis(4-hydroxyphenyl)propane having an EGC of 2040 mmol/kg.

Cymel® 1141 is a highly alkylated melamineformaldehyde resin or mixed methyl-isobutyl alkylation having a non-volatile content of 85%w in isobutanol. The resin contains acid chelating groups in an amount corresponding with 22 mg KOH/g.

Cymel® 1156 is an approximately 100% non-volatile, highly viscous, hexabutoxymethylmelamine resin.

Cymel® 1116 is an approximately 100% non-volatile highly alkylated monomeric melamine formaldehyde crosslinking agent containing ethoxy and methoxy groups.

"Amine value" is expressed in milli-equivalents (amino) nitrogen per gram.

"ECG": epoxy group concentration expressed as mmol per Kg.

"Ep $f_{av}$": average epoxy functionality.

Polyglycidyl ether preparation

Two polyglycidyl ethers were prepared by heating a multifunctional polyether and a monofunctional phenol with stirring to 140° C., whereupon tetramethylammonium chloride (TMAC) was added as a 50% solution in water. The reactor contents were maintained at 140° C. until the reaction had completed, i.e, the calculated EGC had been obtained. After a slight cooling 2-n-butoxyethanol was added to arrive at a solution containing 66.7%w solids. Process details and product characteristics are given in Table 1.

TABLE 1

| Poly-glycidyl ether | Poly-ether type | g | Mono-functional phenol type | g | TMAC g | Product data | | visc. at 25° C. Pa.s |
|---|---|---|---|---|---|---|---|---|
| | | | | | | ECG mmol/kg | Ep.fav. | |
| 1 | I | 615 | nonyl- | 352 | 0.48 | 1550 | 1.5 | 1.3 |
| 2 | II | 665 | " | 432.6 | 0.55 | 1275 | 1.4 | 2.4 |

EXAMPLES I AND II

Preparation of amino group-containing resin binders

The binders were prepared according to the following procedure: An amount of a Polyether solution, 66.7%w in 2-n-butoxyethanol, corresponding with 1.5 eq epoxy, an amount of diglycidyl ether E-1 or E-2 corresponding with 1.5 eq epoxy and additional 2-n-butoxyethanol were homogenized by heating to 90° C. with stirring. After cooling to 25° C., a 25%w aqueous solution of ammonia was added in an amount as indicated below together with a sufficient amount of a 4/1 w/w blend of THF/ethanol to arrive at a clear "solution". Thereupon the temperature of the reactor contents was gradually raised to about 60° C. in approximately 6 hours, during which period virtually all the epoxy groups reacted. Subsequently the temperature in the reactor was increased to 120° C., in as short a time as was possible, and maintained at that temperature to remove excess ammonia, water, THF and ethanol by distillation using a nitrogen purge. The ammonia removal was checked with the aid of a wet paper-pH-indicator. Process details and product characteristics are given in Table 2.

TABLE 2

| Example | | I | II |
|---|---|---|---|
| Polyglycidyl ether type | | I' | II |
| Polyglycidyl solution | g | 1450.5 | 1765 |
| Diglycidyl ether type | | E-1 | E-2 |
| Diglycidyl ether | g | 708 | 735 |
| 2-n-butoxyethanol | g | 634.5 | 704 |
| Ammonia (25% w sol) | g | 408 | 408 |
| THF/ethanol 4/1 w/w | g | 772.5 | 600 |
| Product data | | | |
| Solids content | % | 60.9 | 60 |
| Total amino nitrogen (on solids) | meq/g | 0.98 | 0.87 |
| Tertiary amine | meq/g | 0.14 | 0.123 |
| Secondary amine | meq/g | 0.50 | 0.433 |
| Primary amine | meq/g | 0.34 | 0.314 |
| Viscosity (25° C.) (40% w in 2-n-butoxyethanol) | Pa.s | 1.0 | 1.5 |

EXAMPLES III–VIII

Preparation of carboxylated amide group-containing amino binders

Solutions of the amino group-containing resin binders in 2-n-butoxyethanol, as prepared following Examples I and II, were reacted with varying amounts of TMA at 80° C. for about 30 minutes, which reaction time appeared to be sufficient to convert the anhydride into the corresponding carboxylated amide groups.

Process details and product characteristics are given in Table 3.

EXAMPLES IX–XI

Preparation of aqueous lacquers for electrodeposition

The 2-n-butoxyethanol solutions of the carboxylated amide group-containing amino resin binders as prepared in examples IV-VI were blended respectively with the appropriate amounts of crosslinking compound and 2-n-hexyloxyethanol, neutralized with lactic acid and finally diluted with demineralized water to arrive at lacquers having a solids content of 15%w. The quantities of each of the components used are given in Table 4 together with the characteristics of the lacquers thus prepared.

TABLE 3

| Example | III | IV | V | VI | VII | VIII |
|---|---|---|---|---|---|---|
| Amino binder ex Example | I | I | I | II | II | II |
| Amino binder solution g | 4000 | 4000 | 4000 | 3232.4 | 3232.7 | 3232.7 |
| TMA g | 19.8 | 29.7 | 36.9 | 19.2 | 24.0 | 28.0 |
| Solids content % | 61.1 | 61.2 | 61.3 | 60.2 | 60.3 | 60.3 |
| Acid value mgKolt/g (solids) | 4.7 | 7.0 | 9.4 | 5.7 | 7.1 | 8.3 |
| Total amino nitrogen content on solids | 0.94 | 0.92 | 0.90 | 0.82 | 0.79 | 0.77 |

TABLE 3-continued

| Example | III | IV | V | VI | VII | VIII |
|---|---|---|---|---|---|---|
| meq/g | | | | | | |

COMPARATIVE EXAMPLE A

Preparation of aqueous lacquers for electrodeposition

The amino group-containing resin binder solution as prepared following Example I were blended with 2-n-hexyloxyethanol and "Cymel 1141' at ambient temperature (20° C.). The resulting homogeneous mixture was neutralized with 90%w lactic acid in water and thinned with demineralized water. The lacquer composition and the characteristics thereof are given in Table 4.

EXAMPLES XII–XIV

Cathodic electrodeposition

The lacquers as prepared in examples IX-XI were used to coat 330 ml tin-plate can (2-piece DWI cans) by cathodic electrodeposition. The can formed the cathode of an electrodeposition cell, the anode being a stainless steel member inserted within the can at a substantially uniform separation of 2 millimeters from the can. A potential difference of 100–120V, which resulted after baking in a coating weight per can in the range of 200–250 mg, corresponding with an average dry film thickness in the range of 5 to 6 μm, was applied between the can and anode for 1–2 seconds. After removal from the electrodeposition cell, the coated can was vigorously rinsed with demineralized water and the coating was cured by stoving for 5 minutes at 200° C.

After curing and measuring the weight of the coating, the porosity was tested by using a WACO ENAMEL RATER (ex Wilken-Anderson Co. USA). The principle of this method is that when a potential difference (6.2V) is applied between the can filled with an electrolytic solution and an electrode inserted in said electrolytic solution, a current will pass between the electrode and the inner surface of the can only if the coating has insufficient insulating power, i.e., when the film contains pores. Hence the current measured is a yardstick for the film quality. A current <0.6 mA is considered to correspond with a nonporous film.

Results are given in Table 5 below, in which solvent resistance is expressed in terms of "MEK rubs", the number of double rubs with a methylethylketone-moistened cloth necessary to remove the coatings, while the film appearance (flow) is expressed as a numerical rating resulting from a visual assessment (5: smooth surface, excellent flow, no defects, 4: orange-peel type surface, 3: orange-peel type surface and few bubbles and/or pinholes, 2: many bubbles and/or pinholes).

The sterilization resistance of the coatings was determined by exposure to water at 121° C. for 90 minutes and rated according to a numerical scale ranging from 5: no blushing to 0: very heavy blushing.

The coatings were tested for taste by a taste panel employing mineral water as the taste sensitive beverage.

TABLE 4

| Example | IX | X | XI | Comparative A |
|---|---|---|---|---|
| Binder solution from ex | IV | V | VI | I |
| Binder solution g | 36 | 36 | 37 | 36 |
| "Cymel 1156"g | 6.4 | — | 5.1 | — |

TABLE 4-continued

| Example | IX | X | XI | Comparative A |
|---|---|---|---|---|
| "Cymel 1116" g | — | 6.4 | — | — |
| "Cymel 1141" g | — | — | — | 7.54 |
| 2-hexyloxyethanol g | 2.3 | 2.3 | 5.1 | 2.3 |
| Lactic acid (90% w) g | 1.4 | 1.4 | 1.625 | 1.4 |
| Demineralized water g | 142.6 | 142.6 | 133.2 | 141.5 |
| Lacquer characteristics | | | | |
| Binder/cocuring resin ratio w/w | 7.5/22.5 | 77.5/22.5 | 81/19 | 77.5/22.5 |
| Degree of neutralization | 0.69 | 0.70 | 0.89 | 0.65 |
| pH | 5.4 | 5.5 | 4.7 | 5.7 |
| Conductivity ms. | 702 | 676 | 458 | 760 |

COMPARATIVE EXAMPLE B

Cathodic electrodeposition of aqueous lacquer composition from comparative example The aqueous lacquer composition from comparative example A was applied by electrodeposition onto a 330 ml tin-plate can by the same method as described in examples XII–XIV. The results have been incorporated in Table 5.

The results in Table 5 indicate that the cationic coating compositions made according to the process of the present invention provide coatings which have performance properties on the same high level as those of compositions based on the amino binders and the carboxylated crosslinking compounds.

TABLE 5

| Example | XII | XIII | XIV | Comparative B |
|---|---|---|---|---|
| Lacquer composition from example | IX | X | XI | Comparative A |
| Deposition voltage v | 110 | 100 | 80 | 110 |
| Deposition time s | 1,5 | 2 | 2 | 2 |
| Film appearance | 5 | 5 | 4–5 | 5 |
| Enamel rater reading mA (porosity) | <1 | <1 | <1 | <1 |
| MEK resistance (double rubs) | >50 | >50 | ≦50 | >50 |
| Wedge bend flexibility % failure | 35–40 | 35 | 35–40 | 40 |
| Sterilization resistance | | | | |
| in water | 5 | 5 | 5 | 5 |
| in 0.5% Lactic acid | 3–4 | 3–4 | 4 | 3–4 |
| Taste rating | ←very good*→ | | | |

*passes test for very critical beverages

What is claimed is:

1. A process for preparing a coating composition comprising blending:
   (1) from about 5 to about 35 weight percent of a crosslinking compound, and
   (2) from about 65 to about 95 weight percent of a carboxylated amide group-containing amino binder which is the reaction product of an amino group-containing resin binder and not more than about 0.1 mol of a cyclic anhydride per amino group equivalent of said amino group containing resin binder, which amino group-containing binder comprises the reaction product of
      (a) ammonia, and
      (b) a blend of
         (b$_1$) a polyglycidyl ether having n epoxy groups per molecule, wherein $1 < n < 1.9$, said polyglycidyl ether being the reaction product of a multifunctional polyglycidyl ether having x epoxy groups per molecule, wherein $x > 2$, and (x-n) mol of a monofunctional phenol per mol of the multifunctional polyglycidyl ether, and
         (b$_2$) a diglycidyl ether, having an EGC in the range of from 1000 to 5500 mmol/kg,
   the average molar epoxy functionality of the glycidyl ethers present in the blend of polyglycidyl ether and diglycidyl ether being less than about 1.75.

2. A process according to claim 1 wherein the multifunctional polyglycidyl ether is an epoxy novolac resin in which $2.5 \leq x \leq 3.5$.

3. A process according to claim 1 wherein the monofunctional phenol is a phenol substituted in the para position by a $C_{4-12}$ alkyl substituent.

4. A process according to claim 1 wherein $1.3 < n < 1.6$.

5. A process according to claim 1 wherein the diglycidyl ether is a diglycidyl ether of 2,2-bis(4-hydroxyphenyl)propane having an EGC in the range of from 1800 to 2400.

6. A process according to claim 1 wherein the polyglycidyl ether and the diglycidyl ether are present in the blend of b$_1$ and b$_2$ in a weight ratio in the range of from 75:25 to 45:55.

7. A process according to claim 1 wherein the amino group-containing binder is prepared by reacting ammonia with the blend of b$_1$ and b$_2$ at a temperature in the range of from about 20 to about 120° C. and at atmospheric or slightly above atmospheric pressure.

8. A process according to claim 7 wherein the temperature is in the range of from about 20° to about 70° C.

9. A process according to claim 7 wherein an aqueous ammonia solution is employed.

10. A process according to claim 7 wherein at least about 4.5 equivalents of amino-hydrogen per equivalent of epoxy is employed.

11. A process according to claim 7 wherein an average of about 0.45 to about 0.6 mol of ammonia is reacted per equivalent of epoxy.

12. A process according to claim 7 wherein a water-miscible solvent is present.

13. A process according to claim 1 wherein the cyclic anhydride is reacted with the amino group-containing resin binder at a temperature in the range of from about 30° to about 120° C.

14. A process according to claim 13 wherein the reaction temperature is in the range of from about 60° to about 90° C.

15. A process according to claim 1 wherein the cyclic anhydride is trimellitic anhydride.

16. A process according to claim 1 wherein the crosslinking compound and the carboxylated amide group-containing amino binder are present in a weight ratio in the range of from 15:85 to 30:70.

17. A process according to claim 1 wherein the crosslinking compound is selected from the group consisting of melamine formaldehyde, urea formaldehyde and phenol formaldehyde resins.

18. A coating composition prepared by the process of claim 1.

19. A coating composition prepared by the process of claim 5.

* * * * *